US012754883B2

(12) United States Patent
Gosain et al.

(10) Patent No.: US 12,754,883 B2
(45) Date of Patent: Oct. 6, 2026

(54) APPARATUS, METHOD AND COMPUTER PROGRAM PRODUCT FOR POINT-IN-TIME COPYING TO CLOUD STORAGE PLATFORMS

(71) Applicant: Dell Products L.P., Round Rock, TX (US)

(72) Inventors: Akash Gosain, East Delhi (IN); Robert Hunsaker, Seattle, WA (US); Rabi Shankar Shaw, Bangalore (IN); Anurag Bhatnagar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 18/128,511

(22) Filed: Mar. 30, 2023

(65) Prior Publication Data

US 2024/0330243 A1 Oct. 3, 2024

(51) Int. Cl.
*G06F 16/00* (2019.01)
*G06F 16/178* (2019.01)

(52) U.S. Cl.
CPC .................................. *G06F 16/178* (2019.01)

(58) Field of Classification Search
CPC ..................................................... G06F 16/178
USPC .......................................................... 707/626
See application file for complete search history.

(56) References Cited

U.S. PATENT DOCUMENTS

2011/0145196 A1* 6/2011 Bender ............... G06F 11/1458 707/640
2019/0272253 A1* 9/2019 Vibhor ................ G06F 11/1451
2021/0263651 A1* 8/2021 Sandvig ................ G06F 3/0641
2022/0091744 A1* 3/2022 Kutner .................. G06F 3/0619
2022/0229848 A1* 7/2022 Testardi .................. G06F 3/067
2022/0245034 A1* 8/2022 Nara ................... G06F 11/1435
2023/0403318 A1* 12/2023 Spitulski ................. H04L 67/06

OTHER PUBLICATIONS

Dell EMC, " Dell EMC Unity: CLout Tiering Appliance (CTA) A Detailed Review," White Paper, Mar. 2019, 32 pages.
U.S. Appl. No. 17/860,835, filed in the name of Rabi Shankar Shaw et al. on Jul. 8, 2022, entitled "Policy Based Stub File and Cloud Object Retention.".

* cited by examiner

*Primary Examiner* — Raquel Perez-Arroyo
(74) *Attorney, Agent, or Firm* — Ryan, Mason & Lewis, LLP

(57) ABSTRACT

A method comprises retrieving at least one file of a plurality of files from a source storage location, sending a request to a target storage location for metadata from an object corresponding to the same identifying information as that of the at least one file, and receiving a response from the target storage location, wherein content of the response is based on whether the object corresponding to the same identifying information as the at least one file is present in the target storage location.

20 Claims, 14 Drawing Sheets

301

302

401

402

FIG. 5
Sep 30 06:53:19 (140459607189248) (DEBUG_2) ExtractMetaTags: meta tag fma_layout_version = '7_3_1'
Sep 30 06:53:19 (140459607189248) (DEBUG_2) ExtractMetaTags: meta tag size = '136521'
Sep 30 06:53:19 (140459607189248) (DEBUG_2) ExtractMetaTags: meta tag fma_proto = '1'
Sep 30 06:53:19 (140459607189248) (DEBUG_2) ExtractMetaTags: meta tag fma_size = '136521'
Sep 30 06:53:19 (140459607189248) (DEBUG_2) ExtractMetaTags: meta tag fma_archive_time = '132774723140000000'
Sep 30 06:53:19 (140459607189248) (DEBUG_2) ExtractMetaTags: meta tag fma_cifs_creation_time = '132760896154330380'
Sep 30 06:53:19 (140459607189248) (DEBUG_2) ExtractMetaTags: meta tag fma_cifs_access_time = '132767634197076900'
Sep 30 06:53:19 (140459607189248) (DEBUG_2) ExtractMetaTags: meta tag fma_cifs_modify_time = '132767634212000160'
Sep 30 06:53:19 (140459607189248) (DEBUG_2) ExtractMetaTags: meta tag fma_cifs_change_time = '132774717242119440'
Sep 30 06:53:19 (140459607189248) (DEBUG_2) ExtractMetaTags: meta tag fma_cifs_attributes = '32'
Sep 30 06:53:19 (140459607189248) (DEBUG_2) ExtractMetaTags: meta tag fma_cifs_ownerSID = 'ADMINISTRATOR'
Sep 30 06:53:19 (140459607189248) (DEBUG_2) ExtractMetaTags: meta tag fma_security_desc_len = '84'
Sep 30 06:53:19 (140459607189248) (DEBUG_2) ExtractMetaTags: meta tag fma_cifs_aux_object = 'NULL'

500

602

603

701

702

703

APPARATUS, METHOD AND COMPUTER PROGRAM PRODUCT FOR POINT-IN-TIME COPYING TO CLOUD STORAGE PLATFORMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

Object storage is a type of computer data storage that manages the data as objects. An object includes, for example, data blocks of a file that are maintained together with corresponding metadata and a unique identifier. Object storage manages data differently from file storage, which manages data in hierarchical form (e.g., with folders), and block storage, which divides files into blocks and separately stores the blocks. Object storage systems can accommodate large amounts of unstructured data, and there are few limits to their scalability. There is an increased demand for object storage in local and cloud storage systems.

SUMMARY

Illustrative embodiments provide techniques for the periodic synchronization of cloud objects with data in local storage systems.

In one embodiment, a method comprises retrieving at least one file of a plurality of files from a source storage location, sending a request to a target storage location for metadata from an object corresponding to the same identifying information as that of the at least one file, and receiving a response from the target storage location, wherein content of the response is based on whether the object corresponding to the same identifying information as the at least one file is present in the target storage location.

These and other illustrative embodiments include, without limitation, methods, apparatus, networks, systems and processor-readable storage media.

DETAILED DESCRIPTION

Figure 1:
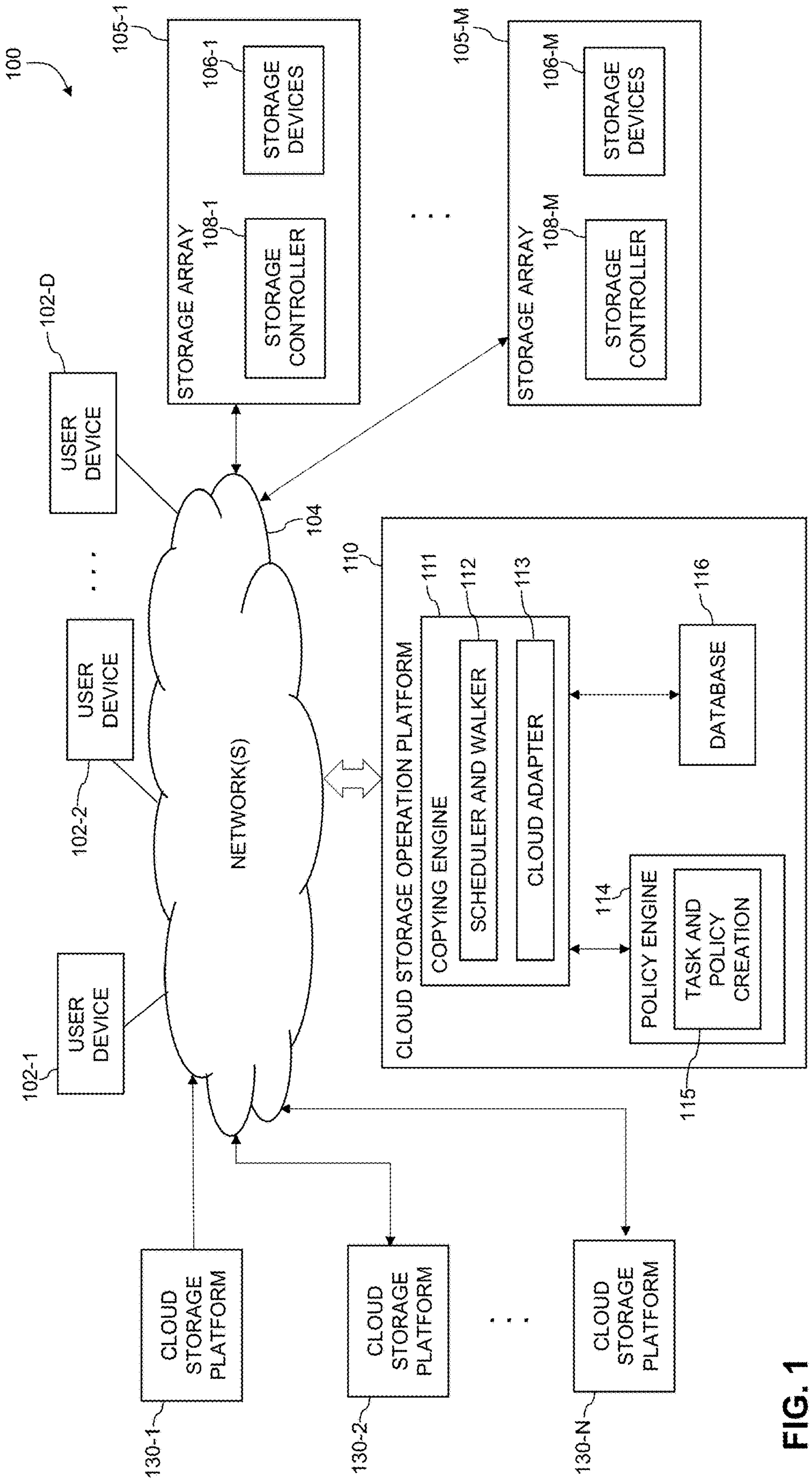
FIG. 1 depicts details of an information processing system with a cloud storage operation platform for synchronizing cloud objects with data in local storage systems according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Illustrative embodiments provide techniques for periodically making point in time copies of data to cloud storage platforms based on policies, while maintaining the same directory structure as that of files for the data on a local storage system. Advantageously, previously created cloud objects are updated with the latest data copies when changes are made to files on the local storage system. Cloud objects are generated for files that have not been previously copied to a cloud storage platform and any changes made to the files thereafter may be incrementally updated to correlate with the most recent modifications. In the case of deleting a file from a local storage system, an already existing object in cloud storage will not be deleted and will be maintained as the last updated version of the file.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers release management personnel or other authorized personnel configured to access and utilize the cloud storage operation platform 110.

The cloud storage operation platform 110 of the system 100 is configured to move and/or copy data between the storage arrays 105 and one or more cloud storage platforms 130-1, 130-2, . . . 130-N, collectively referred to herein as cloud storage platforms 130. The cloud storage operation platform 110 is also configured to move and/or copy data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move and/or copy data, for example, by moving and/or copying data files, snapshots or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move and/or copy data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, Google® and/or IBM® Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for synchronizing cloud objects with data in local storage systems. Referring to FIG. 1, the cloud storage operation platform 110 comprises a copying engine 111, a policy engine 114 and a database 116. The copying engine 111 comprises a scheduler and walker component 112 and a cloud adapter component 113. The policy engine 114 comprises a task and policy creation component 115.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the scheduler and walker component 112 of the cloud storage operation platform 110. The job scheduler interacts with the policy engine 114. For example, referring to the operational flow 200 in FIG. 2, and as described in more detail herein below, once a copying policy including one or more constraints for determining which of a plurality of files are to be copied has been specified by, for example, a user via one of the user devices 102, the policy is provided to the scheduler and walker component 112 from the policy engine 114. The policy and its constraints are used by the scheduler and walker component 112 as a filter to select files which are to be copied from, for example, one or more of the storage arrays 105 to one or more of the cloud storage platforms 130. The scheduler and walker component 112 schedules copying tasks and communicates with the storage arrays 105 to retrieve lists of files to be copied based on the specified policies from the policy engine 114. In other embodiments, policies and their constraints from the policy engine 114 are used by the scheduler and walker component 112 as a filter to select files which are to be archived or tiered from, for example, one or more of the storage arrays 105 to one or more of the cloud storage platforms 130. The scheduler and walker component 112 also schedules archiving or tiering tasks and communicates with the storage arrays 105 to retrieve lists of files to be archived or tiered based on the specified policies from the policy engine 114. Tasks may start at a scheduled time and/or run at periodic intervals that can be pre-configured or user-specified via one or more user interfaces. The cloud adapter component 113 functions as an interface between the cloud storage operation platform 110 and the cloud storage platforms 130. The cloud adapter component 113 may communicate with the cloud storage platforms 130 via one or more application programming interface (API) requests or other types of interfaces (e.g., programmatic interfaces).

The cloud storage operation platform 110 can include at least one API that permits an external component to control selection between various modes of operation. One or more external components can access the configuration file via such an API in order to control a mode of operation of the cloud storage operation platform 110. For example, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement and/or copying in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. In one or more embodiments, the cloud storage operation platform 110 can be used to copy new and updated files from, for example, one or more of the storage arrays 105 to one or more cloud storage platforms 130. The cloud storage operation platform 110 is also configured to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays 105 and/or user devices 102.

In a file copying process, the policy engine 114, and more particularly, the task and policy creation component 115 is configured to receive and process one or more policies comprising administrator or other user-defined criteria for file selection from one or more storage arrays 105. According to an embodiment, in a file copying process, as can be understood from the operational flow 200 in FIG. 2, upon commencement of a copying task (e.g., scheduled by a user via the task and policy creation component 115), the scheduler and walker component 112 receives a corresponding policy for the copying task from the policy engine 114. The corresponding policy can be pushed to the scheduler and walker component 112 from the policy engine 114 or pulled from the policy engine 114 by the scheduler and walker component 112. The scheduler and walker component 112 requests files from the storage arrays 105 (and/or user devices 102 if retrieving files from the user devices 102) based on the policy rules received from the policy engine 114. The storage array(s) 105 and/or user devices 102 return files that match the policy rules. Alternatively, the cloud storage operation platform 110 (e.g., scheduler and walker component 112) iterates through the storage array 105 and/or user device 102 and retrieves the files matching the policy. In a non-limiting example, the scheduler and walker component 112 or storage controllers 108 of the storage arrays 105 scan, for example, the files in the storage arrays 105 and apply policy rules to each file. If there are multiple rules in a policy, the scheduler and walker component 112 or storage controllers 108 apply the rules to a given file until a rule evaluates to "true," and then take the action associated with the rule, such as, for example, "copy" or "don't copy." Some examples of rules governing whether files are copied may be based on one or more constraints such as, for example, when a file was last accessed or modified, when a file was created, and/or a size of a file (e.g., >10 MB). Rules may also be based on file names (e.g., only copy files having certain names or parts of names) and/or directory name (e.g., only copy files from specified directories or from directories having certain names or parts of names). If the scheduler and walker component 112 or storage controllers 108 determine that a given file in a source storage location does not satisfy the policy constraints, that entry is skipped, the next entry is retrieved and the evaluation process is repeated for the next entry.

In illustrative embodiments, the task and policy creation component 115 generates an interface for a user to create one or more copying tasks and one or more associated policies. The interface is accessible via, for example, the user devices 102, and enables a user to specify a plurality of parameters for a copying task. Some non-limiting examples of task parameters include: (i) a source path specifying a starting point for copying (e.g., source storage location); (ii) a destination path specifying a target storage location where the files will be copied; (iii) a copying policy specifying a set of rules (e.g., constraints) to be applied in connection with evaluating whether particular files are to be copied; (iv) one or more protocols (e.g., SMB, NFS, CIFS) to use for reading the files from the source storage location and for writing the files to the target storage location; (v) a name of the copying task; and (vi) server names or other identifying information (e.g., IP addresses) corresponding to the source and target storage locations. According to one or more embodiments, the interface may comprise a plurality of editable fields for a user to input the task and/or policy parameters. Some non-limiting examples of policies may state, for example: (i) copy files whose size >1 GB to a given cloud storage platform 130; or (ii) copy files whose access time <1 week ago to a given cloud storage platform 130. The policies and/or rules can be stored in the database 116. The policy engine 114 may also be used in connection with the creation and processing of policies for file tiering and/or archiving operations in addition to copying operations. In some instances, copying operations may run in parallel to file tiering and/or archiving operations.

Figure 3A:
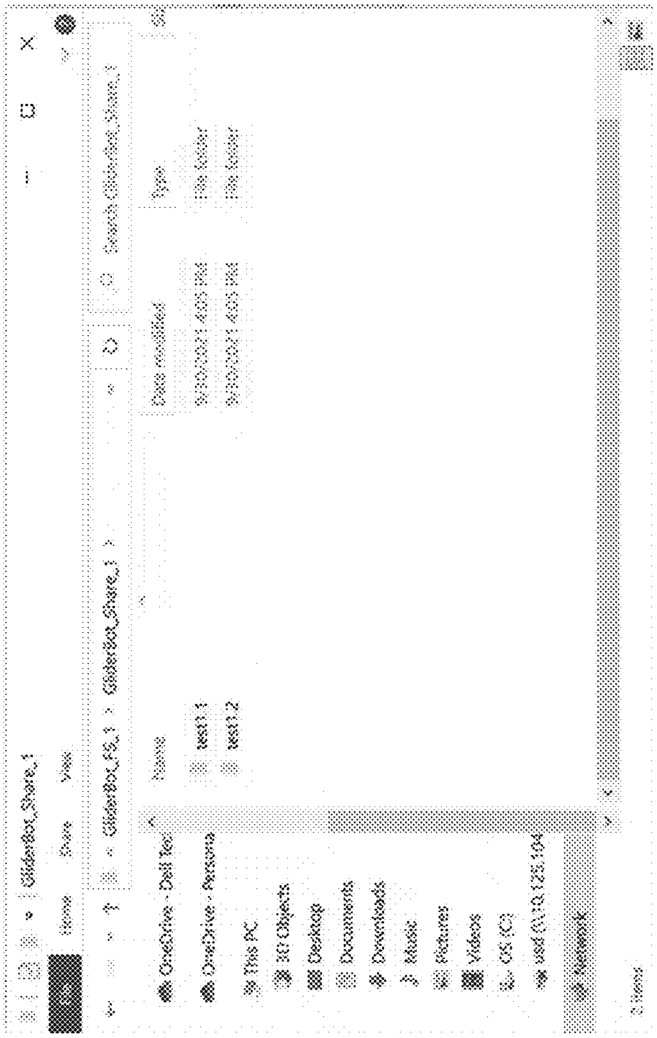
FIG. 3A depicts an example user interface showing folders in a directory in a local storage array according to an illustrative embodiment.
Figure 3B:
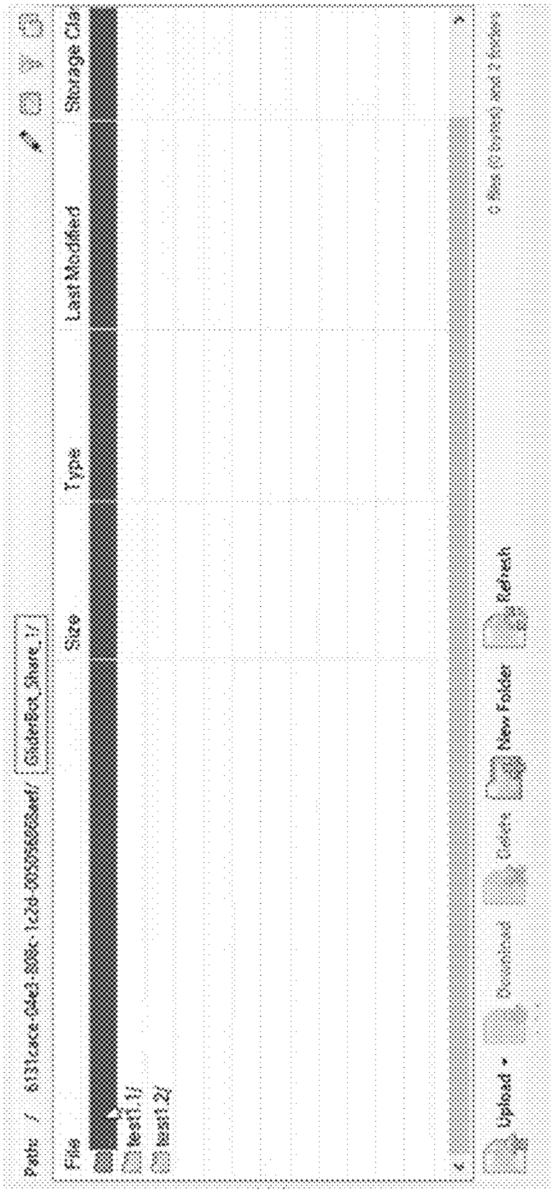
FIG. 3B depicts an example user interface showing copied folders in a copied directory in an object on a cloud storage platform according to an illustrative embodiment.
Figure 4A:
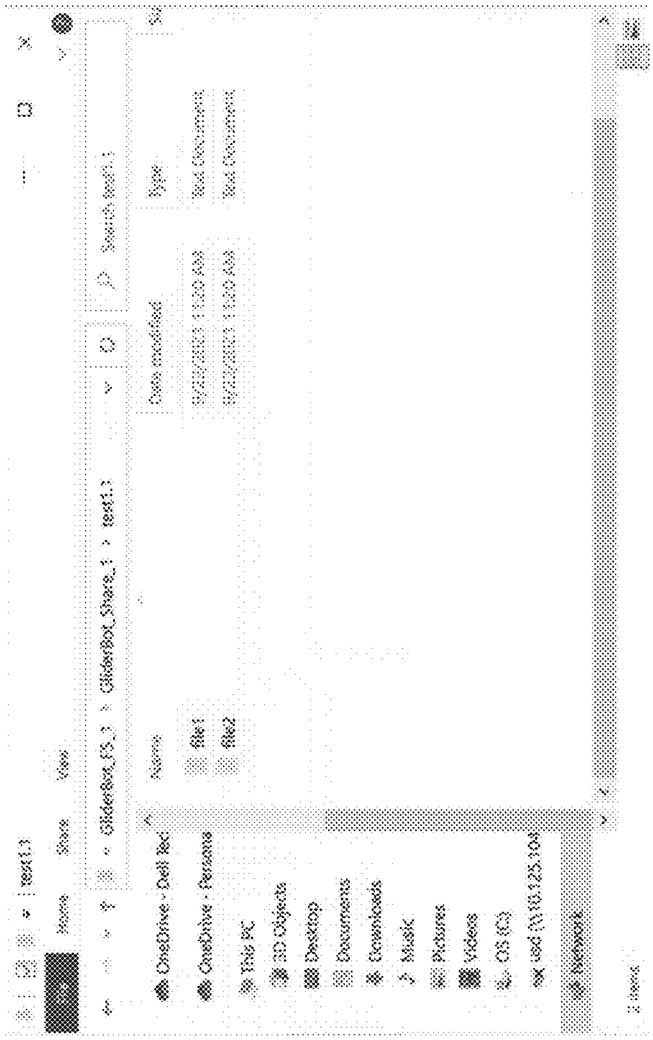
FIG. 4A depicts an example user interface showing files in a folder in a local storage array according to an illustrative embodiment.
Figure 4B:
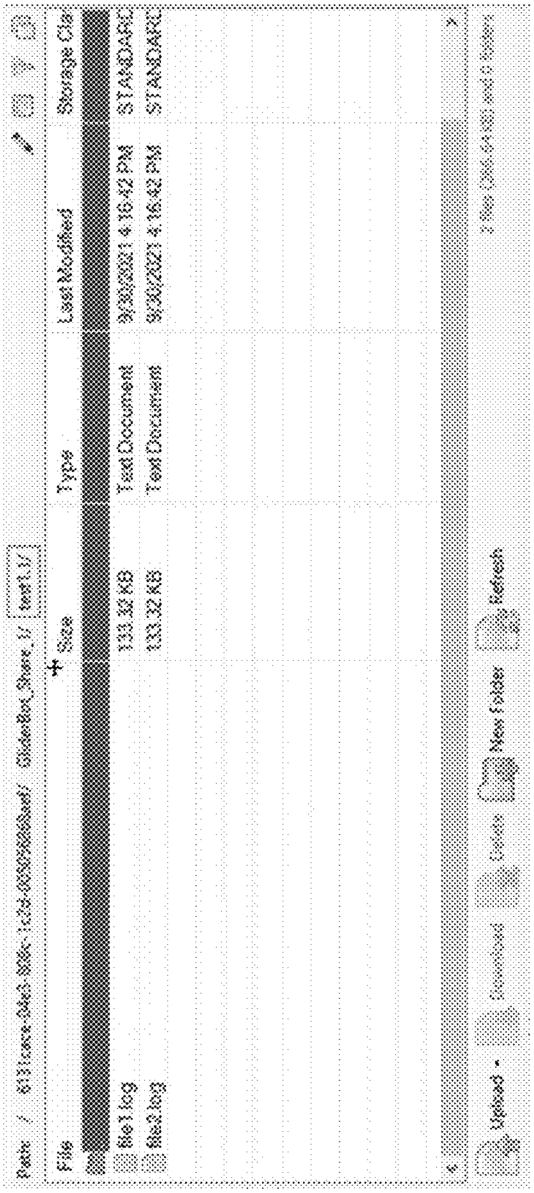
FIG. 4B depicts an example user interface showing copied files in a copied folder in an object on a cloud storage platform according to an illustrative embodiment.

For respective ones of the files satisfying the policy rules received from the storage arrays 105, the scheduler and walker component 112 sends a request via the cloud adapter component 113 to one or more cloud storage platforms 130 for metadata from objects corresponding to the same identifying information as that of the respective ones of the files. The identifying information comprises, for example, the same file path (e.g., directory, folder) and a same file name. For example, FIG. 3A depicts an example user interface 301 showing folders ("test1.1" and "test1.2") in a directory ("GliderBot_Share_1") in a local storage array 105. FIG. 3B depicts an example user interface 302 showing copied folders ("test1.1" and "test1.2") in a copied directory ("GliderBot_Share_1") in an object on a cloud storage platform 130. FIG. 4A depicts an example user interface 401 showing files (with file names "file1" and "file2") in a folder ("test1.1") in the local storage array 105, and FIG. 4B depicts an example user interface 402 showing copied files (with file names "file1" and "file2") in a copied folder ("test1.1") in the object on the cloud storage platform 130. In this case, the directory, folders and file names for the files file1 and file2 (e.g., identifying information) in the cloud object are the same as that in the local storage array 105.

Figure 2:
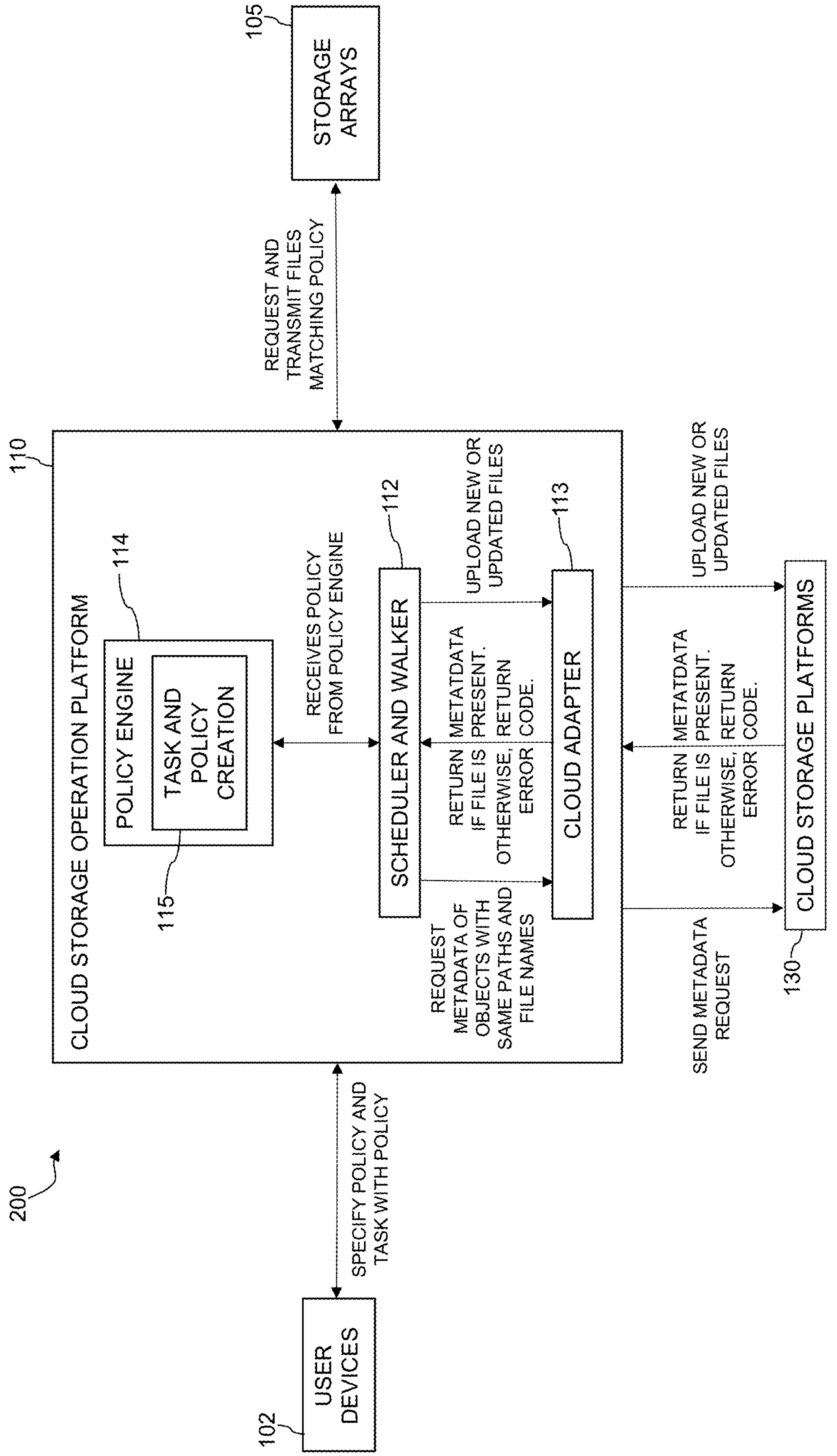
FIG. 2 depicts an operational flow for implementing the periodic synchronization of objects in cloud storage platforms with data in local storage systems according to an illustrative embodiment.
Figure 5:
FIG. 5 depicts a portion of a log illustrating metadata extraction according to an illustrative embodiment.

Referring to the operational flow 200 in FIG. 2, in the case of files that are present in the cloud objects and have the same identifying information in the cloud objects as the retrieved files from the storage arrays 105, the cloud storage platforms 130 return the metadata from the cloud objects in response to the request from the scheduler and walker component 112. The metadata from the object comprises one or more file attributes such as, but not necessarily limited to, a file creation time (c_time), a file modified time (m_time), a file accessed time (a_time) and/or a file size. FIG. 5 depicts a portion 500 of a log illustrating metadata extraction from an object on a cloud storage platform 130. Some of the metadata in FIG. 5 corresponds to c_time, m_time, a_time and file size as well as other attributes such as, for example, archive time and owner site identifier (SID).

Referring to the operational flow 200 in FIG. 2, the scheduler and walker component 112 receives via the cloud adapter component 113, the requested metadata from the cloud storage platforms 130 if the objects are present in the cloud storage platforms 130. For respective ones of the files received from the storage arrays 105, the scheduler and walker component 112 compares the file attributes from the received metadata with the file attributes of the respective ones of the files. If the file attributes of a given file match the file attributes in the received metadata for that file, the scheduler and walker component 112 determines that the given file has already been copied to the corresponding cloud storage platform 130 and the file is not copied during the current copying operation. In other words, the given file is excluded from being copied to the cloud storage platform 130 since the same file already exists in the cloud object. A determination is made that the file is the same due to the file attributes (e.g., c_time, m_time, a_time, file size etc.) of the file from the storage array 105 matching the file attributes from the received metadata.

If the scheduler and walker component 112 determines that the file attributes of a given file are different from (e.g., do not match) the file attributes in the received metadata for that file, the scheduler and walker component 112 determines that the file in the cloud object does not represent the version of the given file in the storage array 105, and needs to be updated. For example, the scheduler and walker component 112 determines that the file in the cloud object is different from the retrieved file from the storage array 105 due to the file attributes (e.g., c_time, m_time, a_time, file size etc.) of the file from the storage array 105 not matching the file attributes from the received metadata. In this case, referring to the operational flow 200 in FIG. 2, the scheduler and walker component 112 uploads the given file to the cloud storage platform 130 via the cloud adapter component 113 so that the cloud storage platform 130 can update the object corresponding to the given file by overwriting a previous version of the given file with the received version of the given file and overwriting the metadata in the object with new metadata comprising the one or more file attributes of the received version of the given file. In illustrative embodiments, the scheduler and walker component 112 and/or the cloud adapter component 113 sends the given file with a command to overwrite the previous version of the given file with the received version and to overwrite the metadata in the object with the new metadata.

Figure 6A:
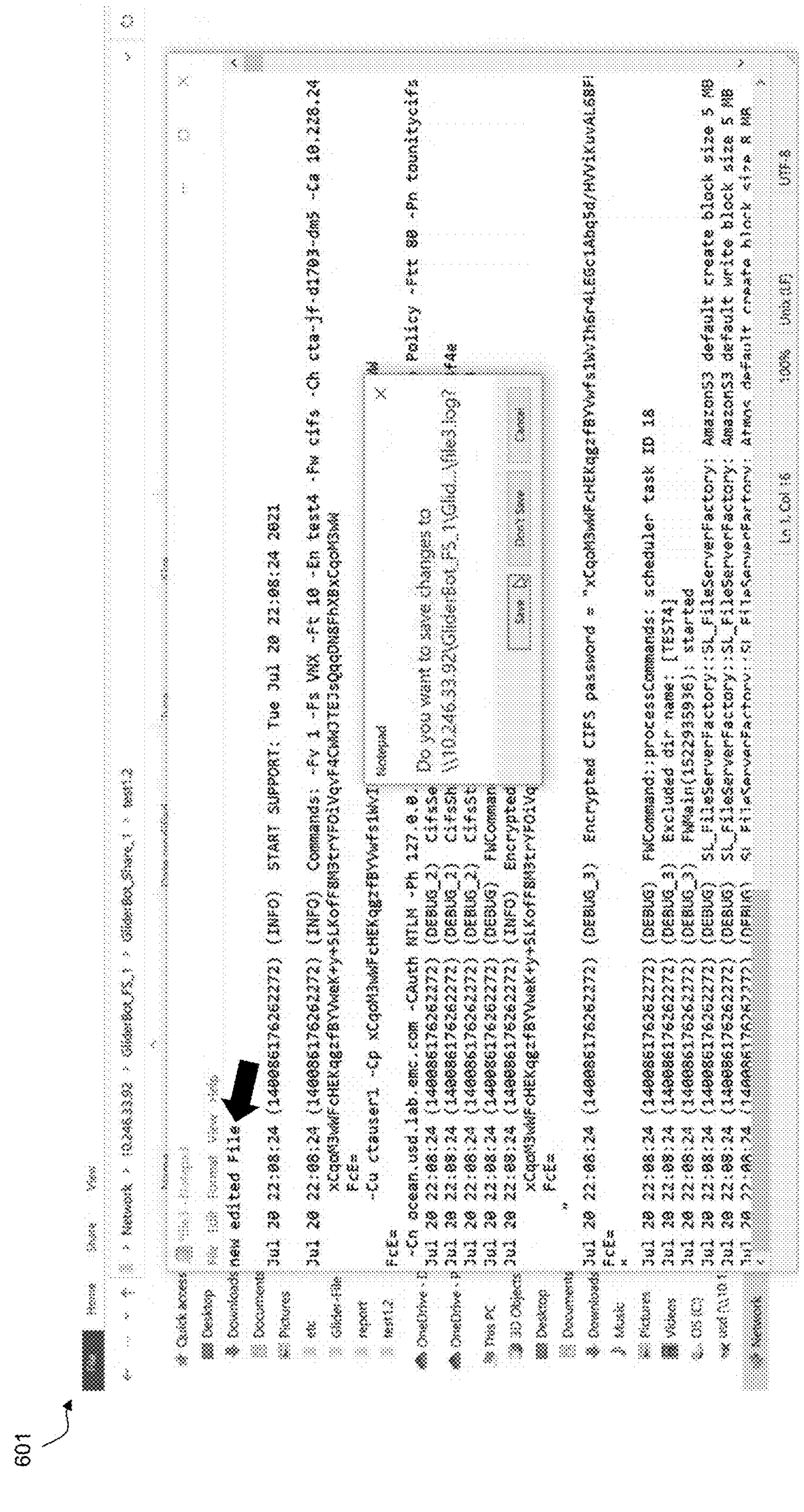
FIG. 6A depicts an example user interface showing editing of a file in a local storage array according to an illustrative embodiment.

For example, referring to FIG. 6A, an example user interface 601 shows editing of a file ("file3") in a file path/GliderBot_Share_1/test1.2/of a local storage array 105.

Figure 6B:
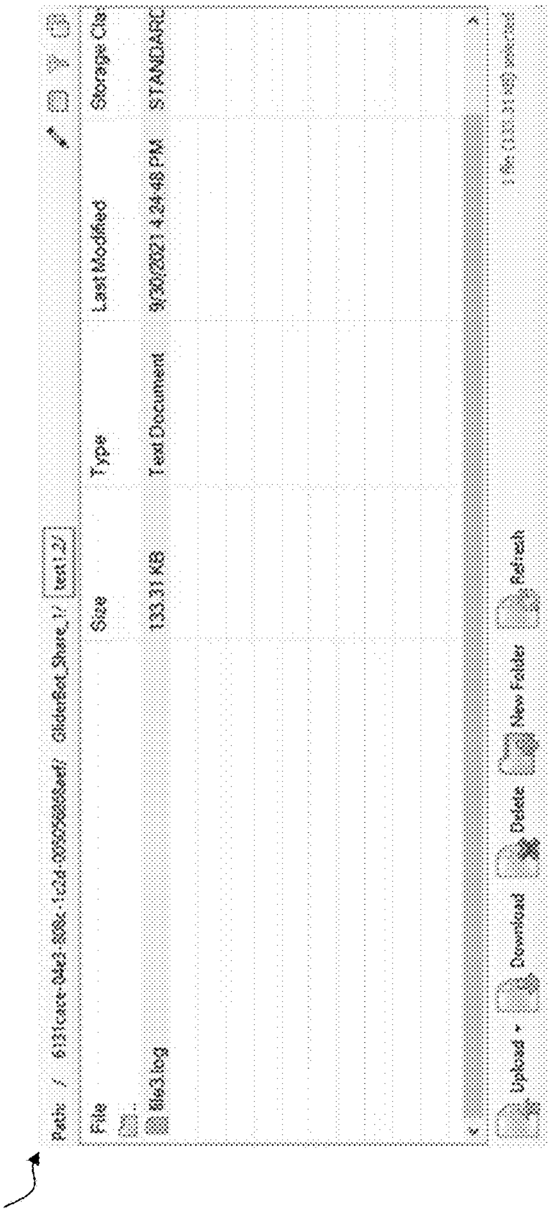
FIG. 6B depicts an example user interface showing the updated file in a directory in an object on a cloud storage platform according to an illustrative embodiment.
Figure 6C:
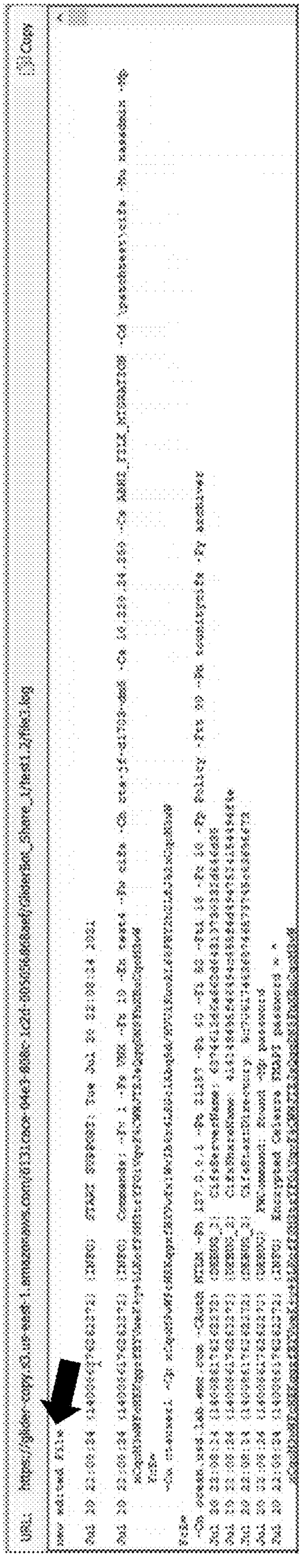
FIG. 6C depicts an example user interface showing the updated file as edited in an object on a cloud storage platform according to an illustrative embodiment.

As can be seen by the arrow, the file is edited to add the text "new edited File." In this case, in a copying operation following the editing of the file where the previous version of the file (e.g., before the editing) exists in an object on a cloud storage platform 130, the scheduler and walker component 112 determines that the file attributes of the file ("file3") are different from (e.g., do not match) the file attributes in the received metadata for that file and needs to be updated. For example, due to the editing, such attributes as the m_time, a_time and file size can change. Based on this, the scheduler and walker component 112 uploads the new version of the file ("file3") to the cloud storage platform 130 via the cloud adapter component 113 so that the cloud storage platform 130 can update the object corresponding to the file by overwriting the previous version of the file with the received version of the file and overwriting the metadata in the object with new metadata comprising the file attributes of the new version of the file. FIG. 6B depicts an example user interface 602 showing the updated file ("file3") in the same file path/GliderBot_Share_1/test1.2/as that of the storage array 105 in an object on the cloud storage platform 130. FIG. 6C depicts an example user interface 603 showing the updated file on the cloud storage platform 130 as edited to include the text "new edited File," as shown by the arrow.

Referring to the operational flow 200 in FIG. 2, in the case of the absence from a cloud storage platform 130 of a cloud object having the same identifying information (e.g., file path and file name) as a retrieved file from a storage array 105, the cloud storage platform 130 returns an indication (e.g., error code) that the object has not been found in response to the request from the scheduler and walker component 112. The indication may comprise, for example, a 404 code ("not found" code) sent from the cloud storage platform 130 to the scheduler and walker component 112 via the cloud adapter component 113. Responsive to the indication that the object has not been found, the scheduler and walker component 112 determines that the retrieved file from the storage array 105 (or another version thereof) has not been copied to the cloud storage platform 130 and uploads the file to the cloud storage platform 130 via the cloud adapter component 113 so that the cloud storage platform 130 can generate an object corresponding to the file or add the file to an existing object. In either case, the cloud storage platform 130 will include in the object a copy of the file, the same identifying information (e.g., path and file name) as that of the file found on the storage array 105, and metadata comprising the file attributes of the file.

Figure 7A:
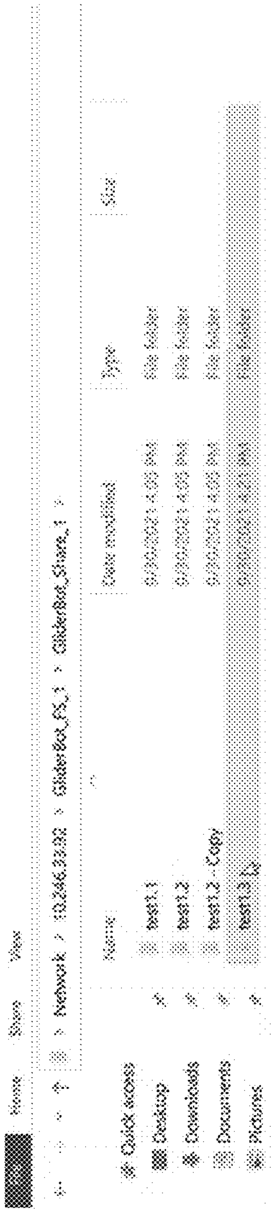
FIG. 7A depicts an example user interface showing a directory and corresponding folders in a local storage array according to an illustrative embodiment.
Figure 7B:
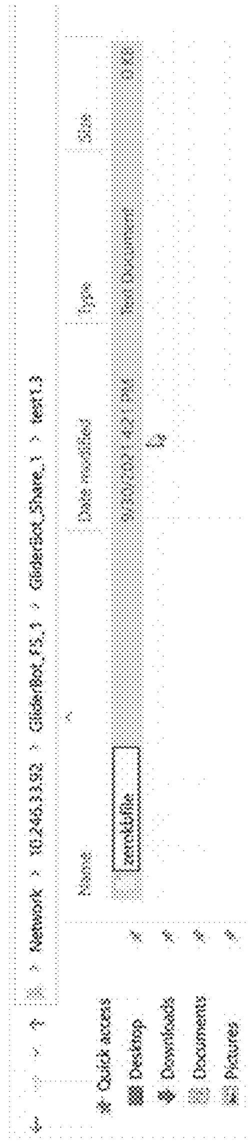
FIG. 7B depicts an example user interface showing a file in one of the folders from FIG. 7A in a local storage array according to an illustrative embodiment.
Figure 7C:
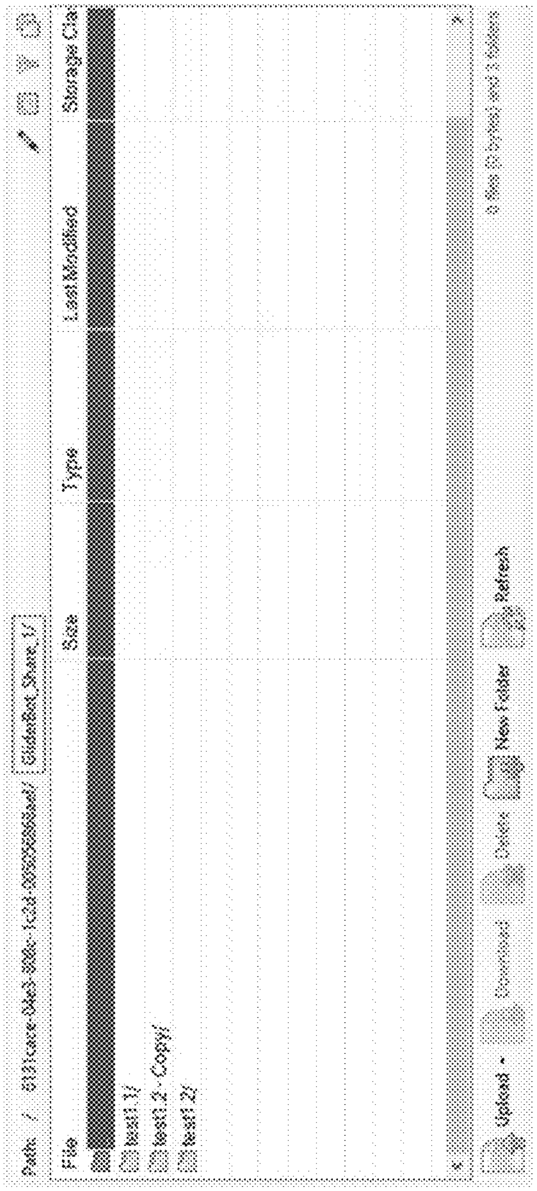
FIG. 7C depicts an example user interface showing that the folder and file from FIGS. 7A and 7B were not copied to an object on a cloud storage platform according to an illustrative embodiment.

As noted herein above, files returned by the storage array 105 match the rules of a given policy, and files that do not match rules are not copied to the cloud storage platforms 130. For example, a rule may specify that a file has at least a given size (e.g., 10 MB) to be copied. In an operational example, FIGS. 7A and 7B depict example user interfaces 701 and 702 showing a directory with a folder "test1.3" in a storage array 105, a file "zerokbfile" in the folder "test1.3" on the storage array 105. As can be seen, the file has a size or 0 KB. In this case, given a size constraint in the policy, the file "zerokbfile" is filtered out and not sent to the scheduler and walker component for copying to a cloud storage platform 130. As shown in the example user interface 703 in FIG. 7C, folder "test1.3" and file "zerokbfile" from FIGS. 7A and 7B were not copied to an object on a cloud storage platform 130.

In illustrative embodiments, when performing copying operations, the cloud storage operation platform 110 is configured to ignore stub files that may be on a storage array

105. As used herein, a "stub file" refers to a file placed in an original file location on a storage device when the original file is archived to an archive location, such as, for example, a cloud storage platform. According to an embodiment, when a stub file is read in an input-output (IO) operation, the IO operation is passed through to the original file located in the archive location, and the original file may be presented to a user as if the original file were in its original location on the storage device. The stub file occupies less memory space ("size on disk") than the original file.

In illustrative embodiments, the cloud storage operation platform 110 imposes little or no limits on destination (e.g., cloud) objects, is configured to permit pausing, resuming and/or canceling of copying jobs, provides users (e.g., via user devices 102) with status and statistics of copying jobs and enables users to perform simulations of copying, tiering and/or archiving operations.

According to one or more embodiments, the database 116 used herein can be configured according to a relational database management system (RDBMS) (e.g., PostgreSQL). The database 116 in some embodiments is implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the copying engine 111, the policy engine 114 and the database 116 in other embodiments can be implemented at least in part externally to the cloud storage operation platform 110, for example, as stand-alone servers, sets of servers or other types of systems coupled to the network 104. For example, the copying engine 111, the policy engine 114 and the database 116 may be provided as cloud services accessible by the cloud storage operation platform 110.

The copying engine 111, the policy engine 114 and the database 116 in the FIG. 1 embodiment are each assumed to be implemented using at least one processing device. Each such processing device generally comprises at least one processor and an associated memory, and implements one or more functional modules for controlling certain features of the copying engine 111, the policy engine 114 and/or the database 116.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the copying engine 111, the policy engine 114, the database 116 and other components of the cloud storage operation platform 110 in the present embodiment are shown as part of the cloud storage operation platform 110, at least a portion of the copying engine 111, the policy engine 114, the database 116 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the copying engine 111, the policy engine 114, the database 116 and other components of the cloud storage operation platform 110, and the elements thereof can each be implemented in the form of one or more LXCs running on one or more VMs. Other arrangements of one or more processing devices of a processing platform can be used to implement the copying engine 111, the policy engine 114 and the database 116 as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other datacenters in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the copying engine 111, the policy engine 114, the database 116 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the copying engine 111, the policy engine 114, the database 116 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

Figure 8:
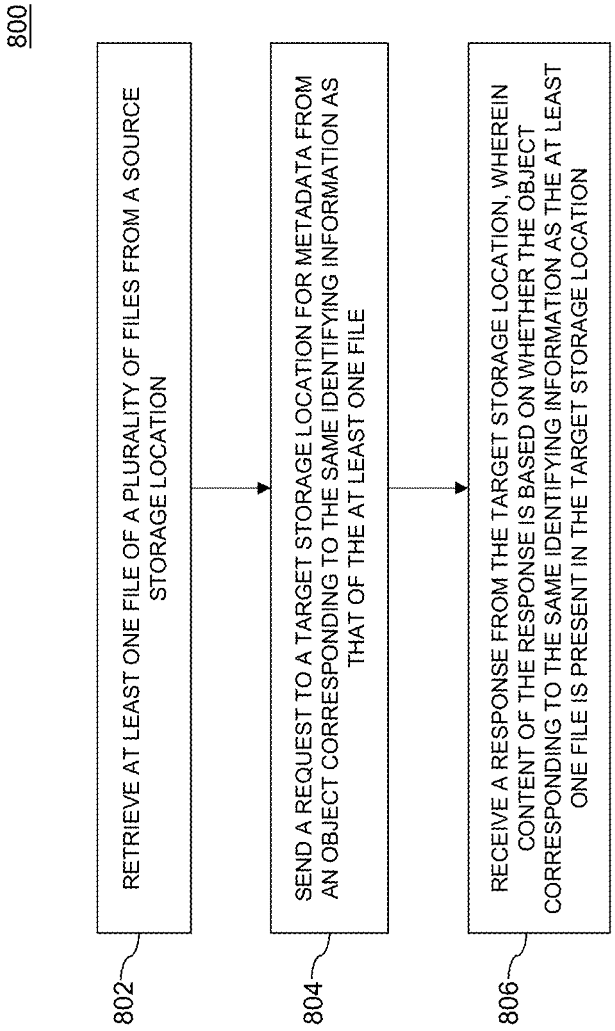
FIG. 8 depicts a process for implementing the periodic synchronization of cloud objects with data in local storage systems according to an illustrative embodiment.

The operation of the information processing system 100 will now be described in further detail with reference to the flow diagram of FIG. 8. With reference to FIG. 8, a process 800 for implementing periodic synchronization of cloud objects with data in local storage systems as shown includes steps 802 through 806, and is suitable for use in the system 100 but is more generally applicable to other types of information processing systems comprising a cloud storage operation platform configured for periodically synchronizing cloud objects with data in local storage systems.

In step 802, at least one file of a plurality of files is retrieved from a source storage location. The source storage location may comprise, for example, a storage array (e.g., on-premises or otherwise local storage array). In step 804, a request is sent to a target storage location for metadata from an object corresponding to the same identifying information as that of the at least one file. The identifying information comprises at least one of a file path (e.g., directory, folder) and a file name. The target storage location may comprise a cloud storage platform.

In step 806, a response is received from the target storage location, wherein content of the response is based on whether the object corresponding to the same identifying information as the at least one file is present in the target storage location. The content of the response comprises the metadata from the object when the object is present in the target storage location. The metadata from the object comprises one or more file attributes such as, for example, a file creation time, a file modified time, a file accessed time and/or a file size. The one or more file attributes from the metadata are compared with one or more file attributes of the at least one file. The at least one file is excluded from being copied to the target storage location in response to the one or more file attributes from the metadata matching with the one or more file attributes of the at least one file.

In illustrative embodiments, the target storage location updates the object in response to the one or more file attributes from the metadata being different from the one or more file attributes of the at least one file. The updating comprises overwriting a previous version of the at least one file with the at least one file and overwriting the metadata with metadata comprising the one or more file attributes of the at least one file.

The content of the response comprises an indication that the object has not been found when the object is absent from the target storage location. Responsive to the indication that the object has not been found, an object in the target storage location is generated or updated to comprise: (i) the at least one file; (ii) the same identifying information as that of the at least one file; and (iii) metadata comprising one or more file attributes of the at least one file.

The process may further include receiving an input specifying one or more rules in connection with retrieving the at least one file of the plurality of files from the source storage location, wherein the one or more rules specify one or more constraints for determining which of the plurality of files are to be retrieved.

It is to be appreciated that the FIG. 8 process and other features and functionality described above can be adapted for use with other types of information systems configured to execute, via a cloud storage operation platform or other type of platform, periodic synchronization of cloud objects with data in other storage systems.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously utilize a CTA or other migration appliance to copy data to cloud objects as an alternative to tiering. Advantageously, users can input one or more rules which define different criteria for the retrieval of files for copying from storage arrays.

Conventional software in, for example, a CTA, is not configured for copying files while maintaining file path structures and file names for sharing and exports. Advantageously, the embodiments provide techniques for copying operations where multiple cloud destinations are supported, objects are readable from an object browser and directory structures are maintained. The embodiments provide technical solutions which enable a cloud storage operation platform (e.g., CTA) to perform copying operations that ignore stub files and, based on the analysis of metadata, prevent copying of files that have already been copied and were not modified. If a file has been modified, the embodiments provide for overwriting of an object with the file and corresponding metadata identifying file attributes.

The embodiments provide a technical solution that enables CTAs to make policy-based point in time copies of on-premises data to cloud storage platforms, while maintaining the directory structure of the on-premises storage system. The embodiments can be used as an alternative to tiering and for emergency offsite backups. The embodiments also facilitate content distribution and global collaboration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
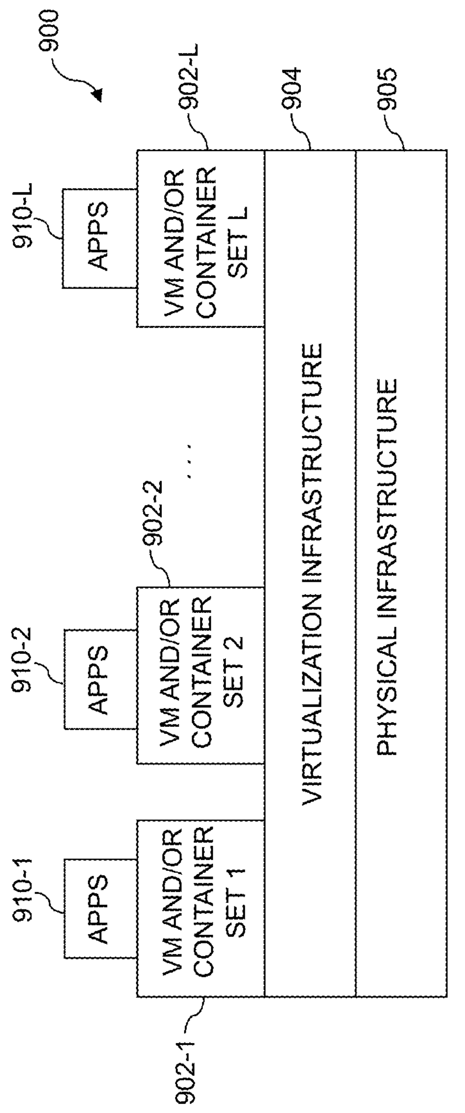
FIGS. 9 and 10 show examples of processing platforms that may be utilized to implement at least a portion of an information processing system according to illustrative embodiments.
Figure 10:
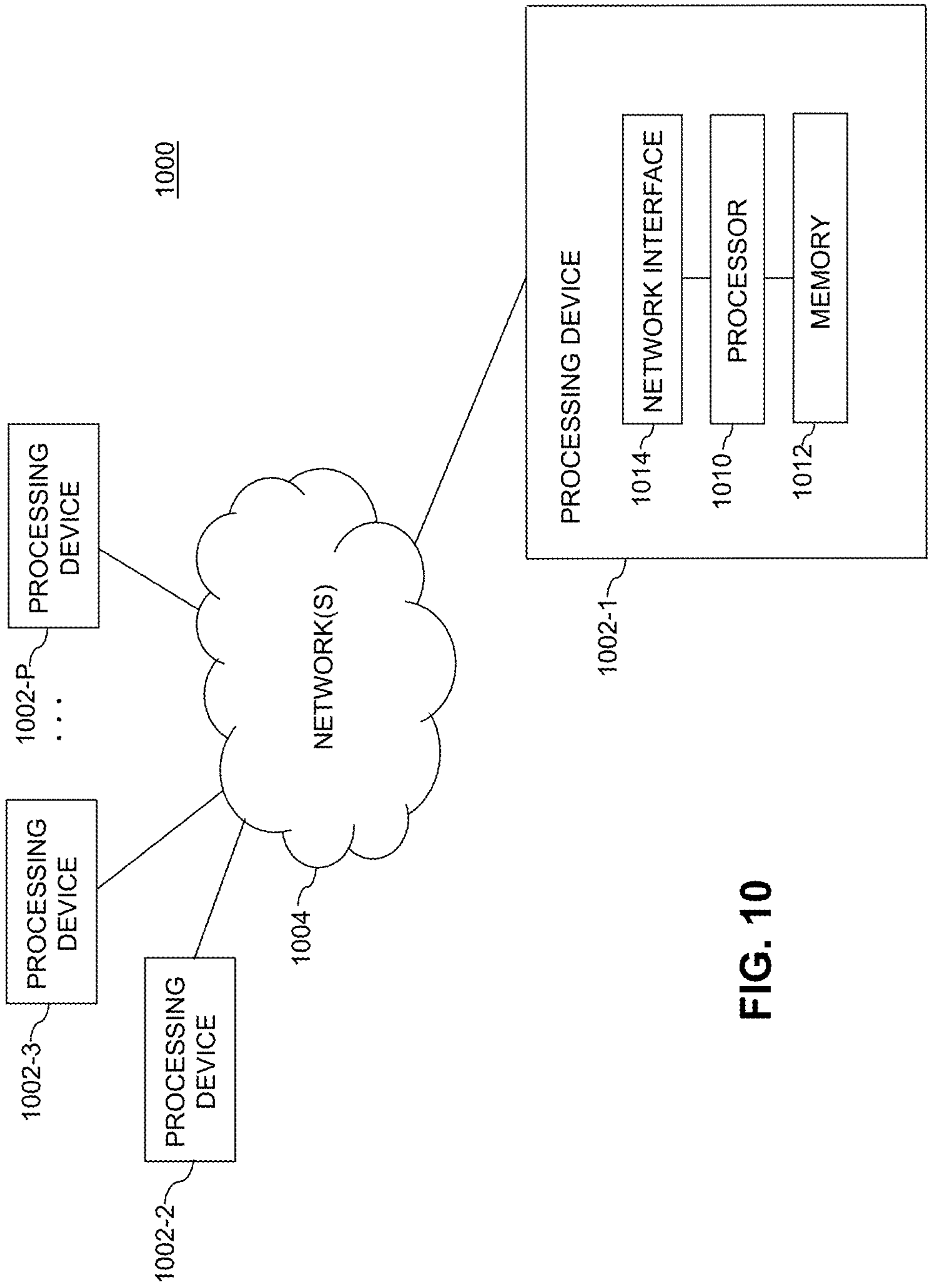

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-P, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing platform comprising a plurality of processing devices;

the at least one processing platform being configured:

to retrieve at least one file of a plurality of files from a source storage location;

to send a request, via an application programming interface, to a target storage location to search for an object comprising metadata and an identifying information value that matches an identifying information value of the at least one file, wherein each identifying information value comprises at least a file name and a file path, wherein a directory structure of the target storage location matches a directory structure of the source storage location;

to receive a response from the target storage location, wherein content of the response comprises one of: (i) an indication that the object matching the identifying information value of the at least one file is not found in the target storage location at the time of the request, wherein the indication comprises an error code; and (ii) the metadata from the object matching the identifying information value of the at least one file in response to the object being present in the target storage location at the time of the request, wherein the metadata comprises one or more file attributes;

in response to receiving the indication that the object has not been found, to cause the object to be generated in the target storage location;

in response to receiving the metadata from the object and prior to uploading the at least one file to the target storage location, to compare the received metadata with metadata of the at least one file to determine whether to update the object in the target storage location by overwriting a previous version of the at least one file with the at least one file retrieved from the source storage location;

to exclude the at least one file from being copied to the target storage location in response to the received metadata matching the metadata of the at least one file; and to upload the at least one file to the target storage location to overwrite both the previous version of the at least one file and the metadata of the object in response to determining that the received metadata differs from the metadata of the at least one file.

2. The apparatus of claim 1 wherein the at least one processing platform is further configured to receive an input specifying one or more rules in connection with retrieving the at least one file of the plurality of files from the source storage location, wherein the one or more rules specify one or more constraints for determining which of the plurality of files are to be retrieved.

3. The apparatus of claim 1 wherein comparing the received metadata with the metadata of the at least one file comprises comparing the one or more file attributes from the metadata with one or more file attributes of the at least one file.

4. The apparatus of claim 1 wherein the one or more file attributes comprise at least one of a file creation time, a file modified time, a file accessed time and a file size.

5. The apparatus of claim 1 wherein the object generated in the target storage location comprises: (i) the at least one file; (ii) the matching identifying information value of the at least one file; and (iii) the metadata of the at least one file.

6. The apparatus of claim 1 wherein the target storage location comprises a cloud storage platform.

7. The apparatus of claim 1 wherein the at least one processing platform comprises a cloud tiering appliance.

8. The apparatus of claim 1 wherein the request to the target storage location is configured to ignore stub files.

9. The apparatus of claim 1 wherein, in response to the at least one file being deleted from the source storage location, the object in the target storage location is maintained as a last updated version of the at least one file.

10. A method comprising:

retrieving at least one file of a plurality of files from a source storage location;

sending a request, via an application programming interface, to a target storage location to search for an object comprising metadata and an identifying information value that matches an identifying information value of the at least one file, wherein each identifying information value comprises at least a file name and a file path, wherein a directory structure of the target storage location matches a directory structure of the source storage location;

receiving a response from the target storage location, wherein content of the response comprises one of: (i) an indication that the object matching the identifying information value of the at least one file is not found in the target storage location at the time of the request, wherein the indication comprises an error code; and (ii) the metadata from the object matching the identifying information value of the at least one file in response to the object being present in the target storage location at the time of the request, wherein the metadata comprises one or more file attributes;

in response to receiving the indication that the object has not been found, causing the object to be generated in the target storage location;

in response to receiving the metadata from the object and prior to uploading the at least one file to the target storage location, comparing the received metadata with metadata of the at least one file;

determining, based on the comparing, that the received metadata differs from the metadata of the at least one file; and uploading the at least one file to the target storage location to overwrite both a previous version of the at least one file and the metadata of the object in response to determining that the received metadata differs from the metadata of the at least one file;

wherein the method is performed by at least one processing platform comprising at least one processing device comprising a processor coupled to a memory.

11. The method of claim 10 wherein the object generated in the target storage location comprises: (i) the at least one file; (ii) the matching identifying information value of the at least one file; and (iii) the metadata of the at least one file.

12. The method of claim 10 further comprising receiving an input specifying one or more rules in connection with retrieving the at least one file of the plurality of files from the source storage location, wherein the one or more rules specify one or more constraints for determining which of the plurality of files are to be retrieved.

13. The method of claim 10 wherein the request to the target storage location is configured to ignore stub files.

14. The method of claim 10 wherein at least one of:

the at least one processing platform comprises a cloud tiering appliance; and the target storage location comprises a cloud storage platform.

15. The method of claim 10 further comprising:

retrieving a second file of the plurality of files from the source storage location;

sending a second request, via the application programming interface, to the target storage location to search for a second object comprising second metadata and a second identifying information value that matches a second identifying information value of the second file;

receiving the second metadata from the second object matching the second identifying information value of the second file in response to the second object being present in the target storage location;

comparing the received second metadata with metadata of the second file;

determining that the received second metadata matches the metadata of the second file; and excluding the second file from being copied to the target storage location in response to determining that the received second metadata matches the metadata of the second file.

16. A computer program product comprising a non-transitory processor-readable storage medium having stored therein program code of one or more software programs, wherein the program code when executed by at least one processing platform causes the at least one processing platform:

to retrieve at least one file of a plurality of files from a source storage location;

to send a request, via an application programming interface, to a target storage location to search for an object comprising metadata and an identifying information value that matches an identifying information value of the at least one file, wherein each identifying information value comprises at least a file name and a file path, wherein a directory structure of the target storage location matches a directory structure of the source storage location;

to receive a response from the target storage location, wherein content of the response comprises one of: (i) an indication that the object matching the identifying information value of the at least one file is not found in the target storage location at the time of the request, wherein the indication comprises an error code; and (ii) the metadata from the object matching the identifying information value of the at least one file in response to the object being present in the target storage location at the time of the request, wherein the metadata comprises one or more file attributes;

in response to receiving the indication that the object has not been found, to cause the object to be generated in the target storage location;

in response to receiving the metadata from the object and prior to uploading the at least one file to the target storage location, to compare the received metadata with metadata of the at least one file to determine whether to update the object in the target storage location by overwriting a previous version of the at least one file with the at least one file retrieved from the source storage location;

to exclude the at least one file from being copied to the target storage location in response to the received metadata matching the metadata of the at least one file; and to upload the at least one file to the target storage location to overwrite both the previous version of the at least one file and the metadata of the object in response to determining that the received metadata differs from the metadata of the at least one file.

17. The computer program product of claim 16 wherein the object generated in the target storage location comprises: (i) the at least one file; (ii) the matching identifying information value of the at least one file; and (iii) the metadata of the at least one file.

18. The computer program product of claim 16 wherein the request to the target storage location is configured to ignore stub files.

19. The computer program product of claim 16 wherein the target storage location comprises a cloud storage platform.

20. The computer program product of claim 16 wherein the at least one processing platform comprises a cloud tiering appliance.

* * * * *